United States Patent [19]

Berding

[11] 3,725,878

[45] Apr. 3, 1973

[54] MEMORY CELL CIRCUIT

[75] Inventor: Andrew R. Berding, Sunnyvale, Calif.

[73] Assignee: International Business Machines Corporation, Armonk, N.Y.

[22] Filed: Oct. 30, 1970

[21] Appl. No.: 85,536

[52] U.S. Cl. ..............................340/173 FF, 307/299

[51] Int. Cl. .........................G11c 11/40, H03k 3/286

[58] Field of Search..........340/173 FF; 307/238, 299

[56] References Cited

UNITED STATES PATENTS

| | | | |
|---|---|---|---|
| 3,636,377 | 1/1972 | Economopoulos et al. | 340/173 FF |
| 3,423,737 | 1/1969 | Harper | 307/238 |
| 3,492,661 | 1/1970 | Pricer | 340/173 FF |

*Primary Examiner*—James W. Moffitt

*Attorney*—Hanifin and Jancin and Martin G. Reiffin

[57] ABSTRACT

A memory cell circuit is provided with a plurality of cells arranged in rows and columns. Each cell comprises a pair of cross-coupled transistors with the collector of each transistor direct-coupled to the base of the other transistor Each transistor has a pair of emitters. One emitter of each pair is connected in a current-switch mode with the emitters of the sense amplifier transistors.

6 Claims, 4 Drawing Figures

INVENTOR
ANDREW R. BERDING

BY Martin G. Reiffin
ATTORNEY

MEMORY CELL CIRCUIT

FIELD OF THE INVENTION

This invention relates to a memory cell circuit, and more particularly to a memory cell circuit adapted to embodiment as a monolithic circuit array.

In advanced computer design, there is a continual need for inexpensive and fast storage devices. Particularly in local storage, it is necessary to have extremely fast access to relatively small amount of information. For compatibility with other circuits, it is desirable for such a local storage to be embodied in monolithic circuits. Such monolithic circuits are characterized by the fact that the entire circuit is diffused into a semiconductor wafer. In such circuits, active components like transistors occupy relatively little space, whereas resistors, inductors, and capacitors occupy excessive space and should be avoided to as great an extent as possible. Even the components which occupy the least space (i.e. Transistors and diodes), should be limited to the lowest possible number. Additionally, these circuits should be extremely fast and furthermore should absorb relatively little power since heat dissipation is a problem when using dense packaging techniques.

DESCRIPTION OF THE PRIOR ART

The so-called "Harper" cell disclosed in U.S. Pat. No. 3,423,737 to L.R. Harper, issued Jan. 21, 1969, and assigned to the assignee of the present application, has come to be well-known as a monolithic memory cell. Reference to that patent indicates that it incorporates many of the features required for advanced computer design. Because of its importance those skilled in the art have been attempting to design circuits which are even faster in operation, which occupy less space, and which have simpler associated control circuitry.

Also pertinent to the present invention is the so-called "Current-switch" first disclosed in U.S. Pat. No. 2,964,652 to Yourke, issued Dec. 13, 1960 and assigned to the assignee of the present invention. The current-switch arrangement is also referred to as "emitter-coupled logic" or "current steered" mode. In this arrangement a constant current flows through either of two emitter-coupled transistors depending upon which transistor base is at a higher level than the other transistor base. One of the main advantages of the current-switch is its high speed.

SUMMARY OF THE INVENTION

It is therefore a primary object of the present invention to provide improved memory cell circuitry utilizing the high speed of the current-switch circuit.

It is a further object of this invention to provide improved memory cell circuitry utilizing a minimum number of components in a simplified circuit arrangement.

It is another object of this invention to provide improved memory cell circuitry suitable for manufacture using monolithic integrated circuit techniques.

It is a further object of this invention to provide improved memory cell circuitry capable of very fast speeds of operation.

It is a still further object of this invention to provide improved memory cell circuitry having simplified associated control circuitry.

An additional object of this invention is to provide an improved memory cell which generates relatively little heat.

These objects and advantages are achieved by a novel arrangement wherein the memory cell transistor emitters are connected to the sense amplifier transistor emitters for operation in the current-switch mode.

The foregoing and other objects, features and advantages of this invention will be apparent from the following more particular description of the preferred embodiments of the invention, as illustrated in the accompanying drawings.

DESCRIPTION OF THE PREFERRED EMBODIMENT

Memory Cells

Figure 1:
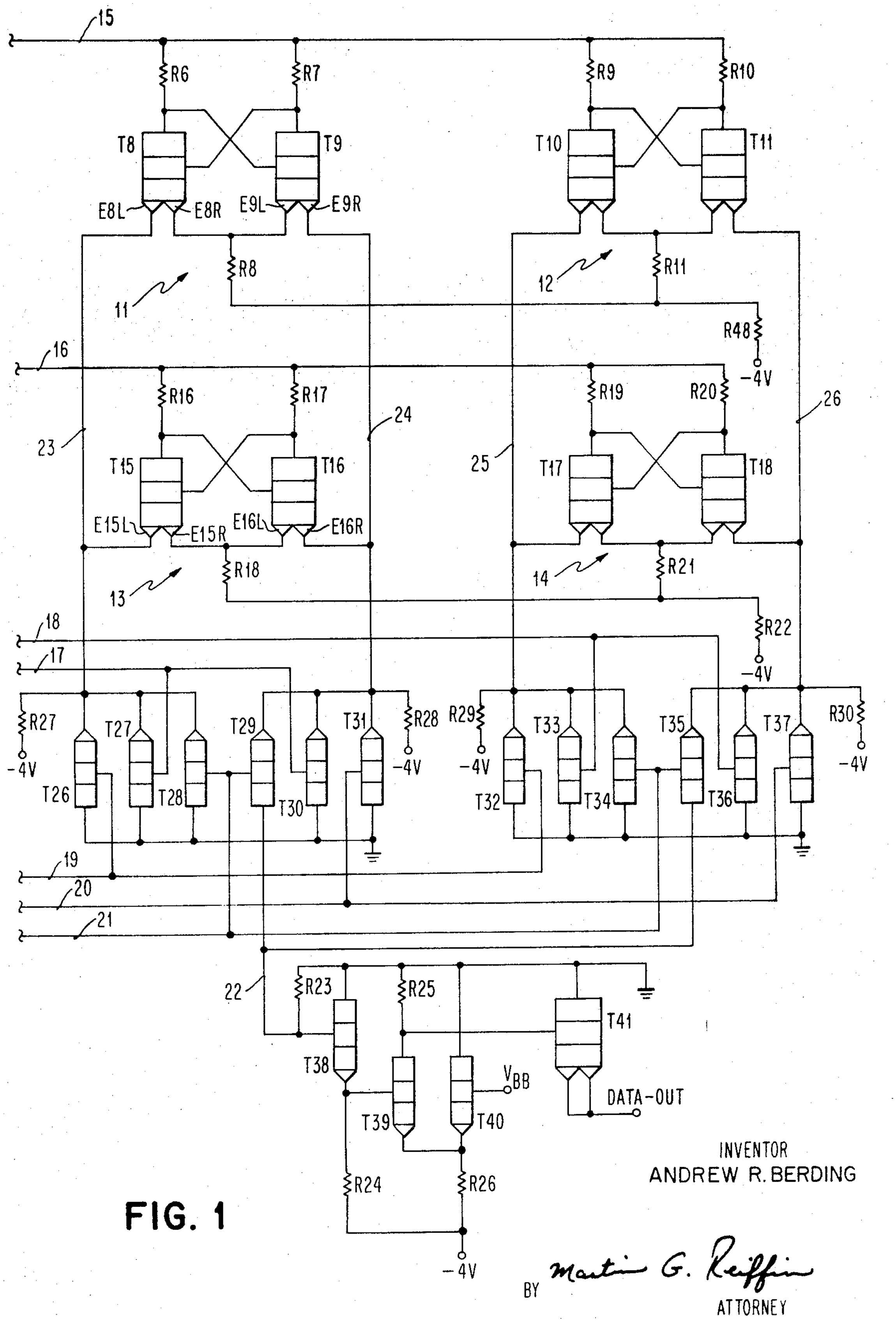
FIG. 1 is a circuit diagram showing the memory cells and sense amplifiers.

Referring first to FIG. 1, there are shown four memory cells, 11, 12, 13, and 14, arranged in two rows and two columns. It will be understood that any practical number of cells may be utilized and the present disclosure shows only four cells for ease of description and clarity in illustration.

Describing particularly the cell 11 in the first row and column there is shown a transistor T8 having dual emitters designated respectively E8L and E8R, and a transistor T9 having dual emitters E9L and E9R. A lead extends from the collector of transistor T8 to the base of transistor T9. Similarly, a lead extends from the collector of transistor T9 to the base of transistor T8. Load resistors R6 and R7 extend from the respective collectors, and the emitters designated E8R and E9L are connected to emitter resistor R8. There is thus provided a bistable circuit whereby the current flows through either transistors T8 or T9 so that one transistor is "on" while the other transistor is "off". The "on" transistor is maintained out of saturation. The other three memory cells are designated generally by the reference numerals 12, 13, and 14 in FIG. 1 and are constructed in a manner similar to that described above for the memory cell 11. More specifically, memory cell 12 comprises transistors T10, T11; memory cell 13 comprises transistors T15, T16; and memory cell 14 comprises transistors T17, T18. Memory cell 12 comprises resistors R9, R10, R11; memory cell 13 comprises resistors R16, R17, R18; and memory cell 14 comprises resistors R19, R20, R21.

The lower ends of resistors R8 and R11 are connected together and then tied to a minus 4 volt supply through resistor R48. The advantage of this arrangement over connecting each emitter resistor directly to a voltage supply is that the resistors may be made with relatively low ohmic value which requires considerably less silicon area in an integrated structure. Resistors R18, R21, and R22 are similarly connected for memory cells 13 and 14.

Referring again to memory cell 11 it will be seen that if transistor T9 is conducting then its collector and hence the base of transistor T8 will be at a "down" level so as to maintain transistor T8 in the "off" state. Since transistor T8 is "off" there is substantially no voltage drop across resistor R6. Therefore, the collector of transistor T8 is at an "up" level and hence the base of transistor T9 is also at an "up" level to maintain transistor T9 "on" as assumed. The values of the voltage supplies and resistors are carefully chosen so that when transistor T9 is conducting the voltage drop across its collector resistor R7 is less than 650 millivolts so that the base-to-collector reverse bias will be insufficient to saturate transistor T9.

Any one of the four memory cells 11, 12, 13, and 14 may be selected for either a Read or Write operation by row select and column select circuitry to be described below. For example, if it is desired to select memory cell 12 then the row select circuitry must select the first row and the column select circuitry must select the second column, the intersection of these two ordinates designating and selecting a particular memory cell, as described below in detail. The rest of the circuitry shown in FIG. 1 which is called the Sense Amplifier and Data/Out circuitry will be described in detail below after the Row Select, Column Select and Read/Write Decode circuits have been described.

Row Select Circuitry

Figure 2:
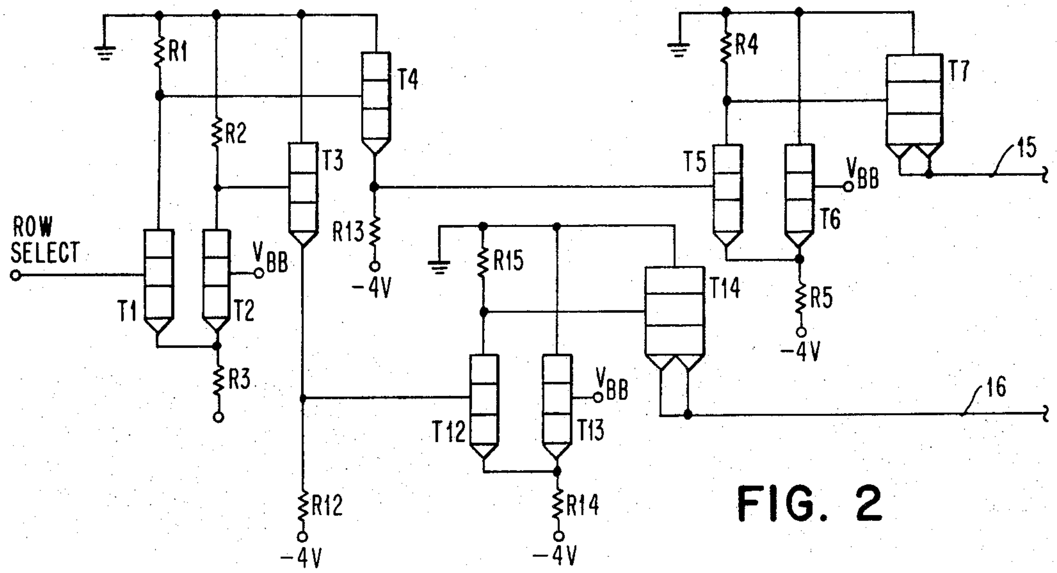
FIG. 2 is a circuit diagram showing the row select circuitry.

Referring now to FIG. 2, the Row Select input is at the base of transistor T1. Transistors T1 and T2 comprise a current-switch with resistor R3 as a common emitter resistor. The base of transistor T2 is tied to a reference voltage $V_{BB}$. If the base of transistor T1 is "up", then transistor T1 will carry all the current and transistor T2 will be cut off. If the base of transistor T1 is "down", then transistor T2 will carry all the current and transistor T1 will be cut off.

First assume an "up" signal level applied to the base of transistor T1. This results in a current flow through resistor R1, transistor T1, and resistor R3. The current flow through resistor T1 will result in a "down" input to the base of transistor T4. Transistor T4 is connected in the emitter-follower configuration with resistor R13 as its load resistor. Therefore a down level on the base of transistor T4 results in a down level on the base of transistor T5. Transistors T5 and T6 comprise a current-switch circuit with resistor R5 as the common emitter resistor and the base of transistor T6 is tied to a reference supply $V_{BB}$. Therefore, the down level at the base of transistor T5 results in transistor T6 carrying all the current and transistor T5 being cut off. Accordingly, resistor R4 is carrying very little current and the base of transistor T7 is at an "up" level. Transistor T7 is connected in the emitter-follower configuration, and therefore, the emitter of transistor T7 which is connected to line 15, is in the "up" level and results in row 1 being selected and, accordingly, partial selection of cells 11 and 12.

Referring now to transistor T2, the latter is cut "off" due to transistor T1 being turned "on" and, therefore, negligible current flows through resistor R2 and the base of transistor T3 is therefore at an "up" level. Transistor T3 is connected in the emitter-follower configuration with resistor R12 as its load resistor. Therefore, the "up" level on the base of transistor T3 results in an "up" level on the base of transistor T12. Transistors T12 and T13 comprise a current-switch with resistor R14 as the common emitter resistor and the base of transistor T13 tied to a reference supply $V_{BB}$. Therefore, the "up" level at the base of transistor T12 results in transistor T12 carrying all the current and transistor T13 being cut off. Resistor R15 is the collector load resistor for transistor T12 and accordingly, the current flow through transistor T12 is also flowing through resistor R15. This results in a "-down" level at the base of transistor T14. Transistor T14 is connected in the emitter-follower configuration, and accordingly, a "down" level at its base results in a "down" level at its emitter which is connected to line 16. This "down" level indicates that row 2 is not selected, and accordingly, non-selection of cells 13 and 14.

If we now assume a "down" level on the base of transistor T1, then transistor T1 will be cut off and transistor T2 will be carrying all the current. Row 2 will be therefore selected instead of row 1. For example, a "down" level on the base of transistor T1 will result in an "up" level on the base of transistor T4 and an "up" level on the base of transistor T5 which will result in a "down" level on the base of transistor T7 and accordingly, a "down" level on the emitter of transistor T7 which is tied to line 15. The "down" level at the base of transistor T1 will cause transistor T2 to conduct, and accordingly, provides a "down" level at the base of transistor T3 and a "down" level at the base of transistor T12 which will result in an "up" level at the base of transistor T14 and accordingly, an "up" level at the emitter of transistor T14 which is tied to line 16.

Column Select Circuitry

Figure 3:
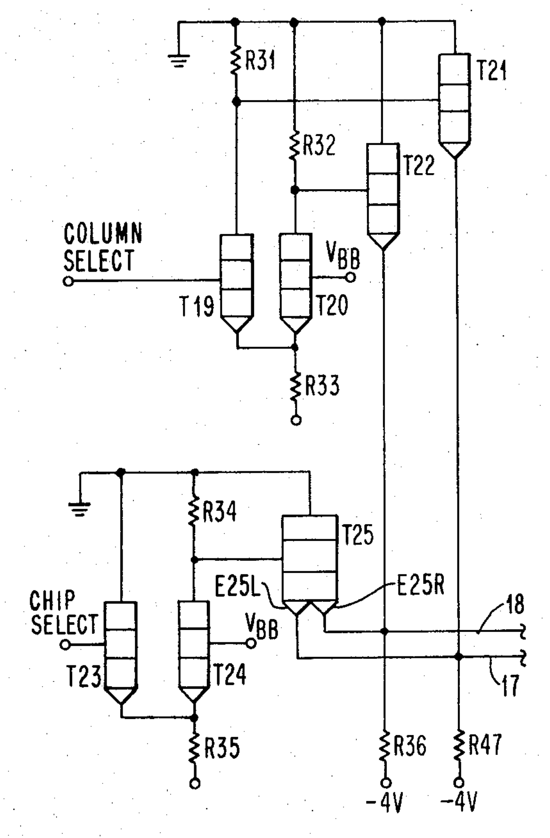
FIG. 3 is a circuit diagram showing the column select circuitry.

Referring now to FIG. 3 the Column Select input is at the base of transistor T19. If the Column Select input is at an "up" level, column 1 will be selected; and if the Column Select input is at a "down" level, column 2 will be selected. However, the column select output signals on lines 17 and 18 will be inhibited unless there is a "-down" level at the Chip Select input which is connected to the base of transistor T23.

First there is described the means by which the Chip Select circuitry can inhibit the Column Select output. Transistors T23 and T24 comprise a current-switch circuit with resistor R35 as the common emitter resistor and the base of T24 tied to a reference supply $V_{BB}$. Resistor R34 is the collector load resistor for transistor T24. If the Chip Select input and accordingly, the base of transistor T23 is at an "up" level then transistor T23 is carrying the current and transistor T24 is cut off. Therefore very little current flows through resistor R34 and the base of transistor T25 is at an "up" level. Transistor T25 is connected in the emitter-follower configuration with resistor R47 and resistor R36 as the emitter resistors for emitter E25L and emitter E25R respectively, and therefore, both of the emitters, E25L and E25R, are at an "up" level. Since the emitters E25L and E25R are directly connected to the Column Select output lines 17 and 18, both lines 17 and 18 are at an "up" level regardless of any signal from the Column Select input. The indication of a column being selected is by a "down" level on either line 17, or 18, and therefore the Column Select signal has been inhibited. If the Chip Select input at the base of transistor T23 is at a "down" level then transistor T24 is carrying the current and transistor T23 is cut off which results in a "down" level at the base of transistor T25. The "-down" level at the base of transistor T25 will effectively disconnect emitters E25L and E25R from lines 17 and 18 and allow lines 17 and 18 to be controlled by the Column Select circuitry.

Referring now to the Column Select circuitry (FIG. 3) transistors T19 and T20 are connected in the current-switch configuration with resistor R33 as the common emitter resistor and the base of transistor T20 connected to a reference supply $V_{BB}$. Resistors R31 and R32 are the collector load resistors for transistors T19 and T20 respectively. If the Column Select input at the base of transistor T19 is at an "up" level transistor T19 will be conducting and transistor T20 will be cut off. Accordingly, the base of transistor T21 which is connected to the collector of transistor T19 will be at a "-down" level and the base of transistor T22 which is connected to the collector of transistor T20 will be at an "up" level. Both transistor T21 and T22 are connected in the emitter-follower configuration and therefore the emitter of transistor T21 which is connected to line 17 is at a "down" level and the emitter of transistor T22 which is connected to line 18 is at an "up" level. Accordingly, column 1 indicated by line 17 has been selected, and column 2 indicated by line 18 is not selected. Of course, it is assumed that the Column Select circuit is not being inhibited by the Chip Select circuit. In order to select column 2 rather than column 1, the Column Select input at the base of transistor T19 must be at a "down" level. This "down" level at the base of transistor T19 will result in an "up" level at the base of transistor T21 and a "down" level at the base of transistor T22. Accordingly, line 17 which is connected to the emitter of transistor T21 will be at an "up" level, and line 18 which is connected to the emitter of transistor T22 will be at a "down" level. The "down" level on line 18 indicates column 2 is now selected.

Read and Write Decode Circuits

Figure 4:
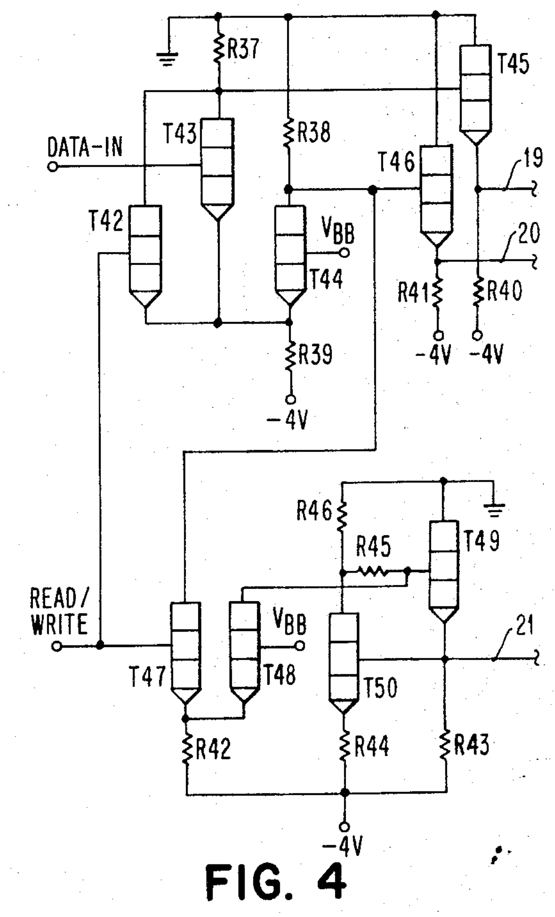
FIG. 4 is a circuit diagram showing the data-in and read/write circuitry.

Referring now to FIG. 4, the input signal to determine whether a read or write operation is to be performed is applied to the bases of both transistors T42 and T47. The Data/In signal is connected to the base of transistor T43 and this signal will be effective only if the Read/Write signal is in the write mode. Line 21 will be put into the "down" level by a write signal and into an "up" voltage level for a read signal. Lines 19 and 20 are controlled by the Data/In signal for a write operation (one at an "up" level and one at a "down" level) only when the Read/Write signal is in the write mode.

If a write operation is to be performed, the Read/Write signal (FIG. 4) will be at a "down" level. Transistors T47 and T48 are connected in a current-switch configuration with resistor R42 as the common emitter resistor and the base of transistor T48 connected to a reference supply $V_{BB}$. Since the write signal places a "down" level on the base of transistor T47, transistor T47 will be cut off and transistor T48 will be conducting. The collector current flow for transistor T48 will be through resistors R46, R45, transistor T48, and resistor R42. Accordingly, resistors R46 and R45 are acting as the collector load resistance for transistor T48 and accordingly, the base of transistor T49 which is tied to the collector of transistor T48 is at a "down" level. Transistor T49 is connected in the emitter-follower configuration with resistor R43 as its emitter resistor. Therefore, line 21, which is tied to the emitter resistor R43, is at a "down" level. The information on line 21 is transmitted to the sense amplifier (FIG. 1) to set up the sense amplifier for a write operation.

The write signal which is applied to transistor T47 (FIG. 4) is also applied to the base of transistor T42. Transistors T42, T43, and T44 are connected in the current-switch configuration with resistor R39 as the common emitter resistor and the base of transistor T44 is tied to a reference supply $V_{BB}$. Resistor R37 is the common collector resistance for transistors T42 and T43 and resistor R38 is the collector resistor for transistor T44. A Data/In signal of a "down" level to the base of transistor T43 will result in a stored "zero" condition ("up" level on line 19 and a "down" level on line 20). A Data/In signal of an "up" level to the base of transistor T43 will result in a stored "one" condition ("down" level on line 19 and an "up" level on line 20). Continuing to assume a Write signal ("down" level) to the base of transistors T42 and T47, there will now be considered the Data/In signal to the base of T43 at a "-down" level. This condition will result in transistors T42 and T43 being cut off and transistor T44 carrying the current. Accordingly, the base of transistor T45, which is connected to the collector of transistor T42, will be at an "up" level, and the base of transistor T46, which is connected to the collector of transistor T44 is at a "down" level. Transistors T45 and T46 are connected in the emitter-follower configuration with resistors R40 and R41 as their respective emitter resistors. Therefore, line 19 which is tied to the emitter of transistor T45, is at an "up" level; and line 20 which is tied to the emitter of transistor T46, is at a "down" level. This results in a stored "zero" condition as noted above, and the signal on lines 19 and 20 are transmitted to the sense amplifier and then to the appropriate cell. If the Data/In signal is at an "up" level then transistor T43 will be conducting and transistor T44 will be cut off which will result in a "down" level at the base of transistor T45 and an "up" level at the base of transistor T46. Accordingly, there will be a "down" level on line 19 and an "up" level on line 20.

In order to perform a Read operation, the Read/Write signal must be at an "up" level. Accordingly, the bases of transistors T42 and T47 are at an "up" level. Both transistors T42 and T47 will therefore be conducting. Resistor R37 is the collector load for transistor T42, and therefore the base of transistor T45 is at a "down" level and it follows that line 19 is at a "down" level. Resistor R38 is now acting as the collector load resistance for transistor T47 and accordingly, the base of transistor T46 is at a "down" level, and it follows that line 20 is at a "down" level. Therefore, for a Read operation, both lines 19 and 20 are forced to a "down" level. Since transistor T47 is conducting, transistor T48 is cut off and accordingly, the base of transistor T49 is effectively disconnected from the collector of T48. Transistors T49 and T50 and associated resistors R43, R44, R45, and R46 now comprise a stabilized bias driver which will provide at its output on line 21 a voltage level that is half-way between the voltages on the collectors of the storage cells. This bias voltage is applied through line 21 to the sense amplifier to set up the sense amplifier to do a read operation on a storage cell. Transistor T49 is connected in the emitter-follower configuration with resistor R43 as its emitter load resistor and its base bias supplied by resistors R45 and R46. Transistor T50 using emitter resistor R44 is in a feedback loop sensing the voltage on line 21 and adjusting the base bias to transistor T49 through its collector resistor R46.

Sense Amplifiers

Referring again to FIG. 1, there is shown a sense amplifier for each column in the memory array. The sense amplifiers are connected in the current-switch configuration. The column select signal selects the desired sense amplifier and both the Write data and Read data are transmitted through the sense amplifier circuitry. Transistors T26, T27, T28, T29, T30, T31, and resistors R27 and R28 comprise a sense amplifier for column 1. Transistors T32, T33, T34, T35, T36, T37 and resistors R29 and R30 comprise a sense amplifier for column 2. Resistor R23 is the collector load resistor which is common to transistors T29 and T35 and the data from a Read operation will be available on line 22 which is tied to the collectors of transistors T29 and T35.

The operation of the sense amplifier for column 1 will now be explained in detail. Transistors T26, T27, T28, and the left-side emitters E8L and E15L of transistors T8 and T15 are connected in a current-switch configuration with resistor R27 as their common emitter resistor. The base of transistor T28 is tied to a shiftable stabilized reference supply through line 21. Transistors T29, T30, T31, and the right-side emitters E9R and E16R of transistors T9 and T16 are connected in a current-switch configuration with resistor R28 as the common emitter resistor and the base of transistor T29 is tied to the shiftable stabilized reference supply through line 21. Line 17 which is tied to the bases of transistors T27 and T30 is the column select signal, and column 1 is selected if line 17 is at a "down" level and non-selected if line 17 is at an "up" level. In actual operation, only one row is selected, and for this explanation it is assumed that row 1 has been selected by placing an "up" level on line 15 and a "down" level on line 16.

Write Operation

Now that the conditions have been set up to operate on storage cell 11, there is first discussed a Write operation into this cell. Line 21 from the shiftable stabilized reference supply must be at a "down" level to set up the sense amplifier for a Write operation. To write a "one" into storage cell 11, the left-side emitter E8L of the cell 11 must be made to conduct. Accordingly, line 19 to the base of transistor T26 will be at a "down" level, and line 20 to the base of transistor T31 will be at an "up" level to write a "one" into the storage cell. This condition will force line 23 to a "down" level and line 24 to an "up" level, and therefore, current will flow in transistor T8 through emitter E8L forcing the collector of transistor T8 to a "down" level and the base of transistor T9 which is tied to the collector of transistor T8 is also forced to a "down" level. Accordingly, transistor T9 is cut off and transistor T8 is now conducting indicating the storage of "one" in storage cell 11.

To write a "zero" into storage cell 11, line 19 must be at an "up" level, and line 20 at a "down" level. This condition will cause line 23 to be at an "up" level, and line 24 to be at a "down" level. Therefore, transistor T9 will conduct through emitter E9R forcing transistor T9 into an "on" state, and it will, in turn, force transistor T8 into an "off" state indicating the storage of a "zero" in the cell.

Read Operation

The Read operation on storage cell 11 will now be explained. Storage cell 11 is again selected by having line 15 at an "up" level and line 16 at a "down" level. Lines 19 and 20 are both placed at a "down" level and the shiftable stabilized reference supply through line 21 is placed at a voltage that is half-way between the voltages on the collectors of the storage cell. If a "one" is stored in storage cell 11 then transistor T8 is conducting, and T9 is cut off. Therefore, the base of transistor T8 is at an "up" level and the base of transistor T9 is at a "down" level. The base of transistor T8 is the most positive of the bases of transistors T8, T26, T27 and T28 and therefore current flows in emitter E8L. The base of transistor T29 is the most positive of the bases of transistors T9, T29, T30 and T31 and therefore T29 will conduct. Current will flow through emitter E8L bringing line 23 to an "up" level, and line 24 will be at a "down" level. Therefore, transistor T29 will conduct and cause line 22 to go to a "down" level. Since line 22 is connected to the base of transistor T38 and the latter is connected in the common collector configuration with resistor R24 as its emitter resistor, the emitter of transistor T38 will be at a "down" level. Transistors T39 and T40 are connected in the current-switch configuration with resistor R26 as the common emitter resistor and resistor R25 as the collector load resistor for transistor T39. The base of transistor T39 is connected to the emitter of transistor T38, and therefore the base of transistor T39 is also at a "down" level which results in transistor T40 conducting and transistor T39 being cut off. Accordingly, the base of transistor T41 which is connected to the collector of transistor T39 is at an "up" level and since transistor T41 is connected in the common collector configuration, the Data/Out line connected to the emitter of T41 is at an "up" level. The "up" level at the Data/Out line indicates a "one" is stored in storage cell 11.

If a "zero" was stored in storage cell 11 then transistor T8 would be cut off and transistor T9 would be conducting, and the base of transistor T9 would be at an "up" level. The "up" level at the base of transistor T9 would cause current to flow in emitter E9R and line 24 would be at an "up" level which would cause transistor T29 to be cut off and line 22 would be at an "up" level. The base of transistor T39 would also be at an "up" level, and the base and the emitter of transistor T41 will therefore go to a "down" level which will mean that the Data/Out line will be at a "down" level. The "down" level on the Data/Out line indicates a "zero" is stored in storage cell 11.

During the Write mode, the shiftable stabilized reference supply from line 21 and connected to the bases of transistors T28 and T29 is at a "down" level, and transistor T29 will never conduct in the Write mode. Accordingly line 22 would be at an "up" level, and this would look like a read "zero" signal. Therefore the Data/Out line will be at a "down" level whenever a Write operation is in progress.

Although the operation of only one sense amplifier has been explained, the operation of the other sense amplifiers and Read or Write operations on any of the storage cells can be easily derived by symmetry.

From the preceeding description, it is seen that extensive use is made of the current-switch circuit. In particular, each sense amplifier comprises a current-switch circuit and is used both to write into the storage cells and to read out of the storage cells. The current-switch circuit is extremely fast and by its use in the sense amplifier there is provided a memory array which has extremely fast Write and Read cycles.

More particularly, a current-switch configuration is made up of the left-half of transistors T26, T27 and T28 of the sense amplifier and the emitters E8L, E15L of the left-half of each cell in that column for that sense amplifier, and also a current-switch configuration is made up of the right-side transistors T29, T30, T31 of the sense amplifier and the emitters E9R, E16R of the right-half of each cell in that column. To perform a write operation, one of these current-switches is used to pull current from one side of the selected cell while the other current-switch draws no current from the opposite side of the selected cell. Accordingly, this current-switch technique results in a very fast write time of less than 2 nanoseconds.

The same current-switch described above is also used to non-destructively read the information in the cell. To accomplish a Read operation, it is only necessary to increase the reference supply voltage (line 21) for the sense amplifier current-switches to a value half-way between the collector voltages of the storage cell and to disable the effect of the Write lines 19, 20 coming to the sense amplifier. A Read operation will then be performed in an extremely fast cycle-time less than one nanosecond. Both of the above improvements are provided by a current-switch amplifier which is used for both writing into and reading out of the cell.

It is to be understood that the particular embodiment shown in the drawings and described above is merely illustrative of one of the many forms which the invention may take in practice and that numerous modifications thereof will readily occur to those skilled in the art without departing from the scope of the invention as delineated in the appended claims, and that the claims are to be construed as broadly as permitted by the prior art.

I claim:

1. A memory circuit comprising a matrix of memory cells arranged in rows and columns, each cell including a pair of transistors each having an emitter and a collector connected to a base of the other transistor of the pair, a plurality of pairs of writing transistors each having an emitter, each pair of writing transistors being associated with a respective column of memory cells, means connecting said emitter of one transistor of every cell in each column of cells to the emitter of one writing transistor of the respective associated pair of writing transistors for coaction of said writing transistor and said cell transistors in a current switch mode, and means connecting said emitter of the other transistor of every cell in each column of cells to the emitter of the other writing transistor of the respective associated pair of writing transistors for coaction of said other writing transistor and said cell transistors connected thereto in a current switch mode.

2. A memory circuit as set forth in claim 1 wherein each of said cell transistors has a second emitter, and a current source connected to the second emitters of each pair of cell transistors.

3. A memory circuit as set forth in claim 1 and comprising a plurality of sensing transistors each having an emitter and each associated with a respective column of cells, means connecting said emitter of each sensing transistor to the emitter of one of the writing transistors associated with the respective column of cells for coaction of said sensing transistor, writing transistor and cell transistors in a current switch mode, and means associated with each sensing transistor for detecting current therethrough.

4. A memory circuit as set forth in claim 3 wherein each of said cell transistors has a second emitter, and a current source connected to the second emitters of each pair of cell transistors.

5. A memory circuit comprising a matrix of memory cells arranged in rows and columns, each cell including a pair of transistors each having an emitter and a collector connected to a base of the other transistor of the pair, a plurality of sensing transistors each having an emitter and each associated with a respective column of cells, means connecting in a current switch mode said emitter of each sensing transistor to the emitter of only one of the cell transistors of all cells of the respective associated column of cells, and means associated with each sensing transistor for detecting current therethrough.

6. A memory circuit as set forth in claim 5 wherein each of said cell transistors has a second emitter, and a current source connected to the second emitters of each pair of cell transistors.

* * * * *